(12) United States Patent
Sakai

(10) Patent No.: US 11,642,575 B2
(45) Date of Patent: May 9, 2023

(54) BALL COLLECTING AND DISCHARGING MACHINE

(71) Applicant: MURATA MACHINERY, LTD., Kyoto (JP)

(72) Inventor: Tsukasa Sakai, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 357 days.

(21) Appl. No.: 16/802,773

(22) Filed: Feb. 27, 2020

(65) Prior Publication Data

US 2020/0298068 A1 Sep. 24, 2020

(30) Foreign Application Priority Data

Mar. 19, 2019 (JP) .............................. JP2019-051323

(51) Int. Cl.
| | |
|---|---|
| *A63B 47/02* | (2006.01) |
| *A63B 47/00* | (2006.01) |
| *G05D 1/02* | (2020.01) |
| *G05D 1/00* | (2006.01) |
| *A63B 69/36* | (2006.01) |

(52) U.S. Cl.
CPC .......... *A63B 47/021* (2013.01); *A63B 47/002* (2013.01); *G05D 1/0088* (2013.01); *G05D 1/0225* (2013.01); *A63B 69/3694* (2013.01); *A63B 2047/022* (2013.01)

(58) Field of Classification Search
CPC ......... G05D 1/0225; G05D 2201/0204; G05D 2201/02
See application file for complete search history.

(56) References Cited

U.S. PATENT DOCUMENTS

| 4,994,970 A | 2/1991 | Noji et al. |
| 11,099,562 B1 * | 8/2021 | Ebrahimi Afrouzi ....................... |
| | | G05D 1/0276 |
| 2015/0260526 A1 * | 9/2015 | Paduano ............. G01S 7/52003 |
| | | 701/461 |

FOREIGN PATENT DOCUMENTS

| CN | 107961510 A | * | 4/2018 | |
| CN | 108499054 B | * | 10/2019 | ........... A63B 47/021 |

(Continued)

OTHER PUBLICATIONS

Translation of CN 107961510 A by Global Dossier; PDF modified to add Paragraph #s to allow better reading and finding of information (Year: 2018).*

(Continued)

*Primary Examiner* — Nicholas Kiswanto
*Assistant Examiner* — Christopher A Buksa
(74) *Attorney, Agent, or Firm* — Keating & Bennett, LLP

(57) ABSTRACT

A main body of a ball collecting and discharging machine includes a traveling portion and a ball collecting and discharging portion to collect and discharge balls. A controller causes the ball collecting and discharging portion to collect the balls scattered in a ball scattered area while causing the traveling portion to cause the main body to travel along a ball collecting route in the ball scattered area. When the ball collecting and discharging portion reaches a state of being ready to discharge balls during or after ball collecting work, the controller causes the traveling portion to cause the main body to travel along the ball discharging route and causes the ball collecting and discharging portion to discharge balls at the ball discharging site.

7 Claims, 14 Drawing Sheets

(56) References Cited

FOREIGN PATENT DOCUMENTS

| | | | |
|---|---|---|---|
| JP | 8-276037 | A | 10/1996 |
| JP | 2963571 | B2 | 10/1999 |
| JP | 2001-069836 | A | 3/2001 |
| JP | 3814230 | B2 | 8/2006 |
| JP | 2018-92620 | A | 6/2018 |
| WO | WO-2009022929 A2 * | 2/2009 | ........... A63B 47/021 |

OTHER PUBLICATIONS

Translation of CN 108499054 B by Global Dossier (Year: 2019).*

* cited by examiner

BALL COLLECTING AND DISCHARGING MACHINE

CROSS REFERENCE TO RELATED APPLICATIONS

This application claims the benefit of priority to Japanese Patent Application No. 2019-051323 filed on Mar. 19, 2019, the entire contents of which are hereby incorporated herein by reference.

BACKGROUND OF THE INVENTION

1. Field of the Invention

The present invention relates to a ball collecting and discharging machine. The present invention relates to a ball collecting and discharging machine that collects golf balls at a driving range, for example.

2. Description of the Related Art

Since a large number of golf balls are scattered in a short period of time at a driving range, they are frequently collected and reused. If a person performs the work of collecting scattered golf balls, the number of workers increases and the cost increases.

In order to solve such a problem, a golf ball collecting machine using an autonomous traveling robot has been introduced (for example, see Japanese Patent No. 2963571). The golf ball collecting vehicle described in Japanese Patent No. 2963571 collects balls while traveling on a set track, and when an amount of the collected balls exceeds a threshold value, the golf ball collecting vehicle is guided to a track leading to a ball discharging site.

In the golf ball collecting vehicle disclosed in Japanese Patent No. 2963571, a track is installed in advance. Accordingly, it is not possible to change the position and the number of ball discharging tracks, and hence the ball discharging work is always performed at a fixed timing.

On the other hand, it is also conceivable to adopt an autonomous traveling robot that travels in a trackless manner, different from the one disclosed in Japanese Patent No. 2963571, for a ball collecting and discharging machine. However, in that case, the following problems may occur.

First, depending on how to approach a ball discharging groove, the robot may fall into the groove.

Second, when a towing structure is adopted for collecting balls, it is necessary to control the angle of the towing structure at the time of discharging the balls, and it is difficult to control the angle accurately.

In order to solve the above problem, it is necessary to specify a relay point to the ball discharging groove in detail at the time of installation of the autonomous traveling robot, resulting in an increase in the workload at the time of installation.

SUMMARY OF THE INVENTION

Preferred embodiments of the present invention enable ball collecting and discharging machines each using an autonomous traveling robot traveling in a trackless manner to safely and reliably perform a ball discharging work.

Hereinafter, a plurality of aspects will be described in accordance with various preferred embodiments of the present invention. These aspects may be combined in any manner where necessary or desirable.

A ball collecting and discharging machine according to an aspect of a preferred embodiment of the present invention is a device that collects and discharges balls by performing an instruction reproduction travel in a ball collecting and discharging portion including a ball scattered area where a plurality of balls are scattered and a ball discharging site where collected balls are discharged. The ball collecting and discharging machine includes a main body, a storage, and a controller.

The main body includes a traveling portion and a ball collecting and discharging portion that is capable of performing operations of collecting balls and discharging balls. The storage stores, as a copy traveling route having been instructed in advance by a worker, information on a ball discharging route in which at least a portion of the ball discharging route is in a vicinity of the ball discharging site.

The controller causes the ball collecting and discharging portion to collect the plurality of balls scattered in the ball scattered area while causing the traveling portion to cause the main body to travel along a ball collecting route in the ball scattered area. In addition, the controller causes the traveling portion to cause the main body to travel along the ball discharging route and causes the ball collecting and discharging portion to discharge balls at the ball discharging site when the ball collecting and discharging portion reaches a state of being ready to discharge balls during or after ball collecting work.

Since the ball discharging route is the copy traveling route having been instructed in advance by the worker, the ball collecting and discharging machine is capable of safely and reliably approaching the ball discharging site. At the time of ball collecting work, on the other hand, the ball collecting and discharging machine is capable of traveling in the ball scattered area by an efficient method other than the copy traveling route.

It is to be noted that the term "instruction reproduction travel" refers to a travel based on a route having been instructed in advance by the worker. The "instruction reproduction travel" includes, for example, a copy travel, which is to travel on the travel route itself having been instructed in advance by the worker, and an exhaustive travel in which the controller determines an autonomous traveling route within a frame having been instructed in advance by the worker.

The term "being ready to discharge balls" includes a state in which a minimum amount of balls that can be literally discharged have been collected, a state in which an amount of balls appropriate to be discharged have been collected, and a state in which an amount of balls that need to be discharged have been collected.

The ball collecting and discharging portion may include a storage amount detector for the balls. In that case, the state of being ready to discharge balls is a state in which a storage amount of the balls exceeds a threshold value.

In this ball collecting and discharging machine, when the storage amount detector detects that the storage amount of the balls exceeds the threshold value, the controller causes the traveling portion to cause the main body to travel along the ball discharging route and causes the ball collecting and discharging portion to discharge the balls at the ball discharging site. The timing at which the controller executes the above operation is, for example, immediately after the storage amount of the balls exceeds the threshold value, after a predetermined length of time elapses since the storage amount of the balls exceeds the threshold value, or when the storage amount of the balls reaches a predetermined point since it exceeds the threshold value.

When the ball collecting and discharging portion reaches the state of being ready to discharge balls, the controller may plan an autonomous traveling route up to a start point of the ball discharging route and cause the traveling portion to cause the main body to travel along the autonomous traveling route.

Since this ball collecting and discharging machine autonomously travels to the start point of the ball discharging route, the ball collecting and discharging machine is capable of performing the ball discharging work within a short period of time after becoming in the state of ready to discharge balls.

The start point of the ball discharging route may be inside or outside the ball scattered area (the same hereinafter).

When the ball collecting and discharging portion reaches the state of being ready to discharge balls, the controller may cause the ball collecting and discharging portion to interrupt the ball collecting work. Thereafter, the controller may plan the autonomous traveling route up to the start point of the ball discharging route and cause the traveling portion to cause the main body to travel along the autonomous traveling route.

Since this ball collecting and discharging machine interrupts the ball collecting work and immediately autonomously travels to the start point of the ball discharging route, the ball collecting and discharging machine is capable of performing the ball discharging work within a short period of time after becoming in the state of being ready to discharge balls.

The controller may plan an autonomous traveling route from an end point of the ball discharging route to a position where the ball collecting and discharging portion interrupted the ball collecting work, and may cause the traveling portion to cause the main body to travel along the autonomous traveling route.

Upon completing the ball discharging work, the ball collecting and discharging machine autonomously travels from the end point of the ball discharging route to the ball collecting work interruption position, and therefore the length of time from finishing the ball discharging work to resuming the ball collecting work is shortened.

The end point of the ball collecting route and the start point of the ball discharging route may match. In that case, when the ball collecting and discharging portion reaches the state of being ready to discharge balls, the controller causes the traveling portion to cause the main body to travel along the ball collecting route, and then causes the traveling portion to cause the main body to travel along the ball discharging route.

Since the end point of the ball collecting route and the start point of the ball discharging route match, the ball collecting and discharging machine always travels to the end point of the ball collecting route and then moves to the ball discharging route even if the ball collecting and discharging machine reaches the state of being ready to discharge balls in the middle of the ball collecting route. Accordingly, it is not necessary for the ball collecting and discharging machine to autonomously travel to discharge balls, thus simplifying the control.

A ball collecting and discharging machine using an autonomous traveling robot traveling in a trackless manner according to a preferred embodiment of the present invention safely and reliably performs the ball discharging work.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. First Preferred Embodiment

Figure 1:
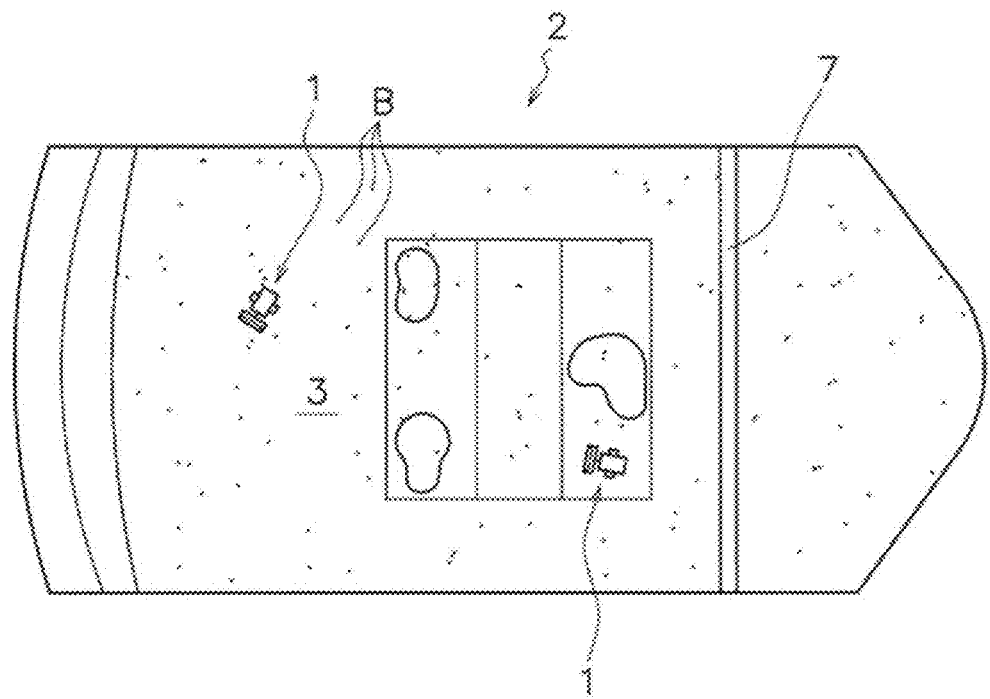
FIG. 1 is a schematic plan view of a driving range.
Figure 2:
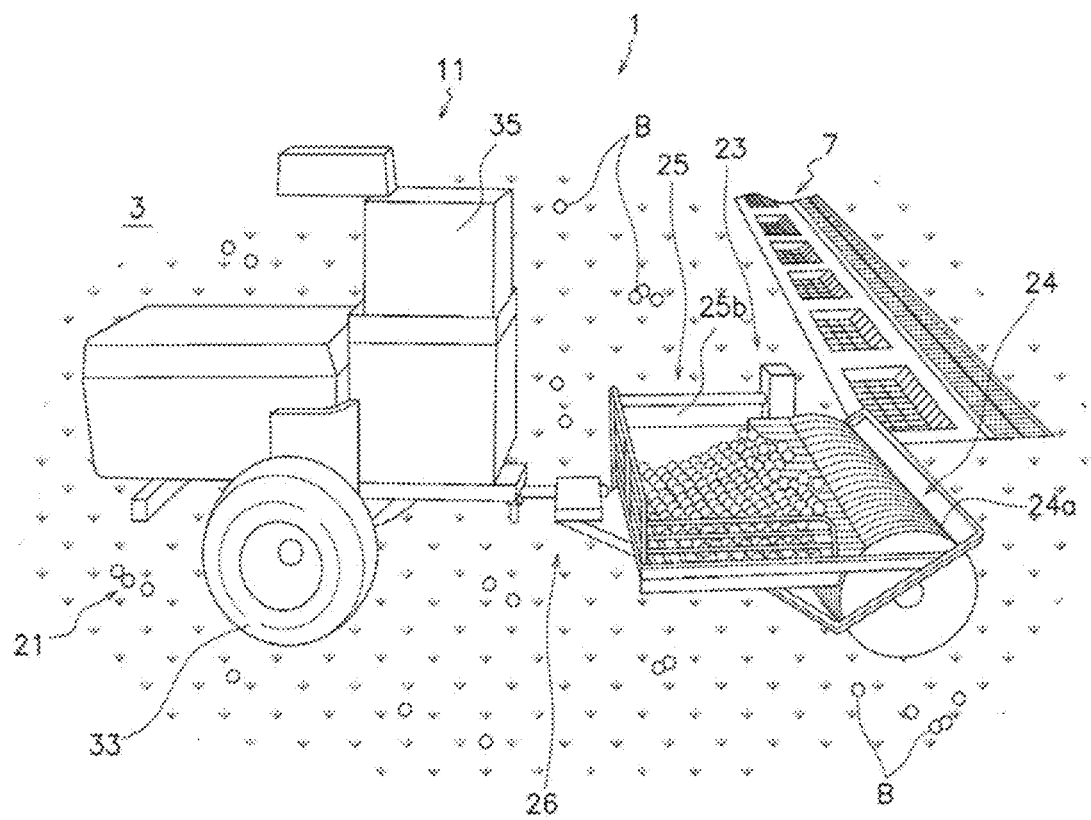
FIG. 2 is a schematic perspective view of a ball collecting and discharging machine.
Figure 3:
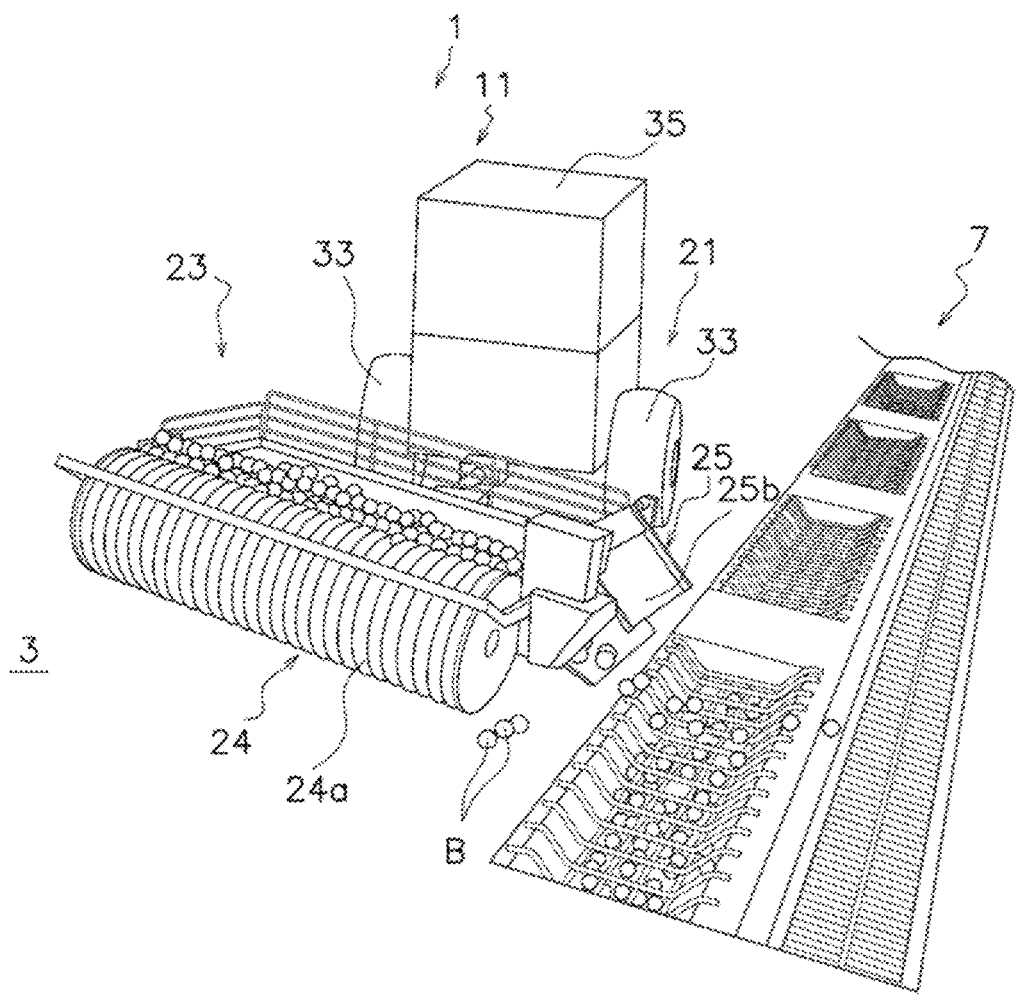
FIG. 3 is a schematic perspective view of the ball collecting and discharging machine.

A ball collecting and discharging machine 1 will be described with reference to FIGS. 1 to 3. FIG. 1 is a schematic plan view of a driving range. FIGS. 2 and 3 are schematic perspective views of the ball collecting and discharging machine.

In the present preferred embodiment, the ball collecting and discharging machine 1 is used in a driving range 2 (an example of ball collecting and discharging portion). This is because a large number of golf balls B are scattered in a short period of time in the driving range 2, and it is necessary to collect and reuse scattered golf balls B.

The driving range 2 has a ball scattered area 3, in which the plurality of golf balls B are scattered, and a ball discharging site 7, in which the collected golf balls B are discharged. In this preferred embodiment, the ball scattered area 3 is turfed. The ball discharging site 7 is a groove provided in the ball scattered area 3. The golf balls B delivered to the ball discharging site 7 are sent to a collection pool by discharged water.

The ball collecting and discharging machine 1 is a device that collects and discharges balls by performing instruction reproduction travel in the driving range 2. The term "instruction reproduction travel" is a travel based on a route having been instructed in advance by the worker, and includes, for example, a copy travel, which is to travel on the traveling route itself having been instructed in advance by the worker, and an exhaustive travel in which the controller determines an autonomous traveling route within a frame having been instructed in advance by the worker.

The ball collecting and discharging machine 1 includes a main body 11, a storage 13, and a controller 15.

The main body 11 includes a traveling portion 21, and a ball collecting and discharging portion 23 capable of collecting the golf balls B and discharging the golf balls B. Specifically, the traveling portion 21 is a device that causes the ball collecting and discharging machine 1 to travel. The traveling portion 21 includes, for example, a travel motor 31 (FIG. 4) provided in the main body 11, and wheels 33.

The ball collecting and discharging machine 1 includes a GNSS (Global Navigation Satellite System) receiver 35 provided in the main body 11. The GNSS receiver 35 acquires information (position information) on a current position of the ball collecting and discharging machine 1 on the ground. As a result, the ball collecting and discharging machine 1 is capable of traveling while grasping its own position.

The ball collecting and discharging machine 1 may include a geomagnetic sensor (not illustrated) provided in the main body 11. The geomagnetic sensor measures an orientation of geomagnetism at the position of the ball collecting and discharging machine 1 (the main body 11) in the driving range 2. Due to this, it is possible to measure the direction in which the ball collecting and discharging machine 1 (the main body 11) is facing in the driving range 2.

In addition, a pair of the GNSS receivers 35 may be provided in the main body 11. For example, the pair of GNSS receivers 35 are arranged side by side on a predetermined axis (e.g., an axis parallel to the straight-traveling direction of the ball collecting and discharging machine 1) of the main body 11. Due to this, the orientation (direction) of the main body 11 in the driving range 2 can be calculated from two coordinate values (combination of latitude and longitude) obtained from the pair of GNSS receivers 35 (Moving Baseline method). As a result, by calculating the direction using the coordinates obtained by the GNSS receivers 35, the direction of the ball collecting and discharging machine 1 can be easily measured (calculated) without performing calibration for each place of use.

The ball collecting and discharging portion 23 includes a ball collecting portion 24 collecting the golf balls B and a ball discharging portion 25 discharging the golf balls B. The ball collecting portion 24 is a publicly known technique and includes a pickup rotor 24a that rotates along with the travel of the main body 11. It is to be noted that the ball collecting portion 24 may have a configuration in which the pickup rotor 24a rotates due to operation of a ball collecting portion motor (not illustrated). The ball discharging portion 25 is a publicly known technique and has a ball discharging portion motor 25a (FIG. 4) and a ball discharging gate 25b driven by the ball discharging portion motor 25a.

In this case, a determination that the balls can be discharged is made at a predetermined timing, such as when the ball collecting and discharging machine 1 travels a predetermined distance or the traveling order of the route.

As an alternative preferred embodiment, the ball collecting and discharging portion 23 may include a ball storage amount detector (not illustrated). When the storage amount of the balls exceeds the threshold value in the storage amount detector, the balls become ready to be discharged. Specifically, the storage amount detector is, for example, a weight sensor to measure the weight of the stored golf balls B and a photoelectric sensor detecting the height of the upper surface of the stored golf balls B.

The storage 13 is provided in the controller 15 in this preferred embodiment. The storage 13 is a portion or an entirety of a storage region of a storage device of a computer system defining the controller 15, and stores various types of information related to the ball collecting and discharging machine 1. The storage 13 stores a ball collecting route travel schedule 101 and a ball discharging route travel schedule 103, for example, as will be described later.

The controller 15 preferably is a computer system including a CPU, a storage device (RAM, ROM, hard disk drive, SSD, or the like) and various types of interfaces. The controller 15 is configured or programmed to perform various types of controls related to the ball collecting and discharging machine 1.

Figure 4:
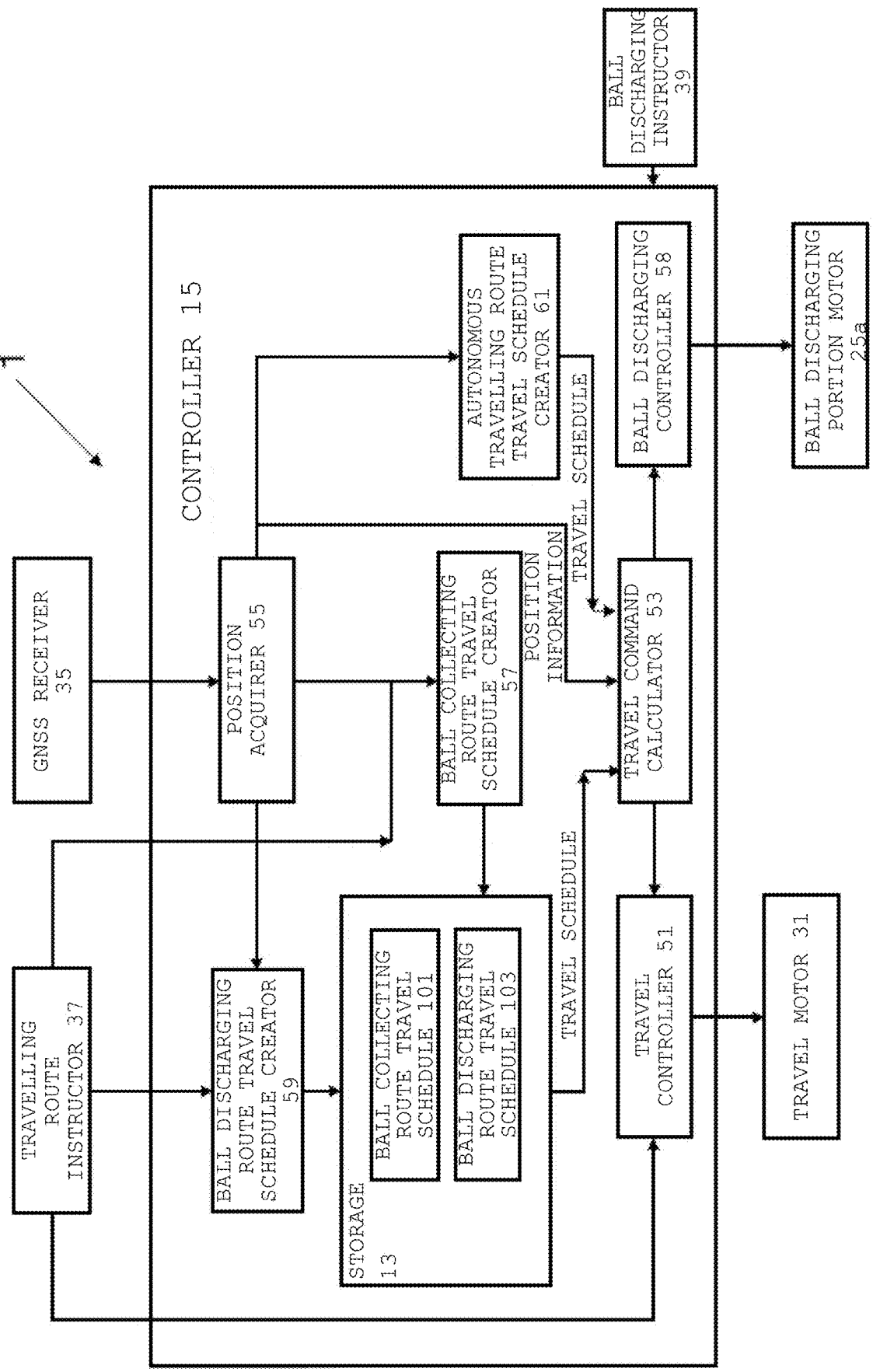
FIG. 4 is a block diagram illustrating an overall configuration of a controller.

The configuration of the controller 15 will be described in detail with reference to FIG. 4. FIG. 4 is a block diagram illustrating an overall configuration of the controller. All or some of functional blocks of the controller 15 described below may be implemented by a program executable by a computer system defining the controller 15. In this case, the program may be stored in a memory part and/or the storage device. All or some of the functional blocks of the controller 15 may be implemented as a custom IC such as an SoC (System on Chip).

The controller 15 may be defined by a single computer system or may be defined by a plurality of computer systems. When the controller 15 is defined by a plurality of computer systems, for example, functions implemented by a plurality of functional blocks can be executed by allocating the functions to the plurality of computer systems at any ratio.

The controller 15 includes a travel controller 51. The travel controller 51 controls the travel motor 31. The travel controller 51 receives a travel command from a travel command calculator 53 (described later). The travel controller 51 receives a travel command from a traveling route instructor 37 in an instructed travel mode. The traveling route instructor 37 is, for example, an operator to operate the ball collecting and discharging machine 1, such as a steering wheel. That is, the travel controller 51 receives the operation of the worker through the traveling route instructor 37.

The controller 15 includes the travel command calculator 53. The travel command calculator 53 outputs a travel command to the travel controller 51. Data given to the travel command calculator 53 is the ball collecting route travel schedule 101 in an exhaustive travel mode and the ball discharging route travel schedule 103 in a copy travel mode. The travel controller 51 calculates a target rotation speed of the travel motor 31, and outputs, to the travel motor 31, drive power to rotate the travel motor 31 at the target rotation speed.

The controller 15 includes a ball discharging controller 58. The ball discharging controller 58 controls the ball discharging portion motor 25a.

The controller 15 includes a position acquirer 55. The position acquirer 55 acquires position information acquired by the GNSS receiver 35. As a result, the controller 15 is able to grasp which position in the ball scattered area 3 the ball collecting and discharging machine 1 is moving. Specifically, the position acquirer 55 receives absolute coordinates (latitude/longitude) of the current location obtained by RTK (Real Time Kinematic) positioning.

The controller 15 includes a ball collecting route travel schedule creator 57. The ball collecting route travel schedule creator 57 creates the ball collecting route travel schedule 101 described above. The ball collecting route travel schedule 101 is a schedule in which the ball collecting and discharging machine 1 travels evenly (as if "filling") in a traveling region TA. The traveling region TA is a region in which the ball collecting and discharging machine 1 travels in a travel environment.

When the manual operation instruction mode is executed, the ball collecting route travel schedule creator 57 receives position information having been input from the position acquirer 55 at a predetermined length of time (e.g., every control cycle in the controller 15). As a result, the ball collecting route travel schedule creator 57 acquires a point sequence of a plurality of pieces of position information, and determines the traveling region TA based on the acquired point sequence of the plurality of pieces of position information.

Next, the ball collecting route travel schedule creator 57 creates the ball collecting route travel schedule 101 in the traveling region TA, and stores the same in the storage 13.

The controller 15 includes a ball discharging route travel schedule creator 59. The ball discharging route travel schedule creator 59 creates the ball discharging route travel schedule 103 based on the rotation amount and rotation direction of the steering wheel having been input from the traveling route instructor 37 in the instructed travel mode. The ball discharging route travel schedule 103 is a set of passing time in the instructed travel mode and passing point data corresponding to the passing time, and indicates the traveling route in which the ball collecting and discharging machine 1 autonomously moves at the time of execution of the reproduction travel mode. At the time of execution of the reproduction travel mode, the ball collecting and discharging machine 1 controls the travel motor 31 so as to reach the target position with reference to the target position indicated in the ball discharging route travel schedule 103. In this preferred embodiment, the ball discharging route travel schedule 103 is a travel schedule of a ball discharging route 42, which is a copy traveling route having been instructed in advance by the worker, and at least a portion of the ball discharging route 42 is in a vicinity of the ball discharging site 7.

With the above configuration, the travel command calculator 53 calculates a control command (reproduction travel control command) for autonomous travel on the traveling route indicated in the ball collecting route travel schedule 101 or the ball discharging route travel schedule 103 as reproduction travel control at the time of execution of an autonomous travel mode, and outputs the control command to the travel controller 51. The travel command calculator 53 calculates the reproduction travel control command based on the information stored in the travel schedule and the position information acquired from the position acquirer 55.

Due to this, at the time of execution of the autonomous travel mode, the travel controller 51 is capable of autonomously moving the ball collecting and discharging machine 1 by controlling the travel motor 31 based on the reproduction travel control command.

The controller 15 includes a ball discharging instructor 39. The ball discharging instructor 39 is, for example, an operation panel including a press button, and the ball discharging instructor 39 transmits, for example, the operation of the press button by the operator to the ball discharging controller 58.

The ball discharging controller 58 receives a button operation from the ball discharging instructor 39 and converts the operation into a ball discharging instruction. The ball discharging controller 58 drives the ball discharging gate 25b by outputting the ball discharging instruction to the ball discharging portion motor 25a.

The ball discharging conditions related to the ball discharging work are stored by the travel command calculator 53 in association with the ball discharging route travel schedule 103.

At the time of execution of the autonomous travel mode, based on the ball discharging conditions associated with the ball discharging route travel schedule 103, the ball discharging controller 58 controls the ball discharging portion motor 25a and opens the ball discharging gate 25b. Due to this, the ball collecting and discharging machine 1 is capable of autonomously executing the ball collecting work and the ball discharging work in accordance with the ball discharging conditions during autonomous traveling.

The controller 15 includes an autonomous traveling route travel schedule creator 61.

If the position information of the start point and the end point is obtained, the autonomous traveling route travel schedule creator 61 calculates an optimal (preferably the shortest route) travel schedule, and creates an autonomous traveling route travel schedule (not illustrated). The route generation algorithm is publicly known and is not particularly limited.

In the autonomous traveling route travel mode, the travel command calculator 53 transmits a travel command to the travel controller 51 based on the autonomous traveling route travel schedule.

Although not illustrated, a sensor and a switch to detect the state of each device, and an information input device are connected to the controller 15.

An encoder (not illustrated) is attached to an output rotation shaft of the travel motor 31, for example. Furthermore, a front detector and a rear detector (not illustrated) are attached to the main body 11. These are laser range finders (LRF) having a detection range of 180° or more. The front detector and the rear detector may be TOF (Time Of Flight) cameras or the like.

Figure 5:
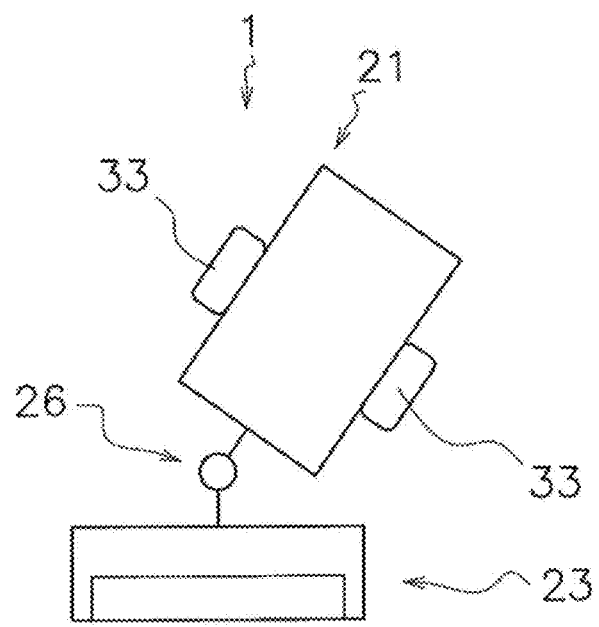
FIG. 5 is a schematic plan view of the ball collecting and discharging machine.
Figure 6:
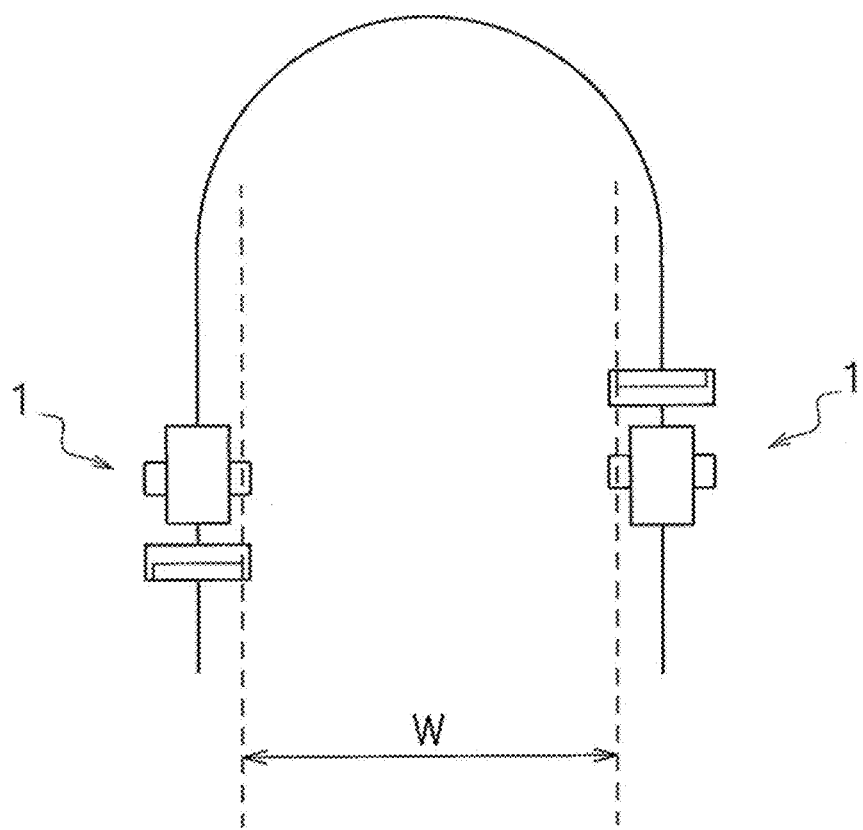
FIG. 6 is a schematic plan view illustrating turn-around traveling of the ball collecting and discharging machine.

With reference to FIGS. 5 and 6, the travel characteristics of the ball collecting and discharging machine 1 will be described. FIG. 5 is a schematic plan view of the ball collecting and discharging machine. FIG. 6 is a schematic plan view illustrating turn-around traveling of the ball collecting and discharging machine.

As mentioned above, the ball collecting and discharging portion 23 is coupled to the traveling portion 21 by a towing structure 26, and the minimum radius at the time of rotation becomes large. Accordingly, when the ball collecting and discharging machine 1 performs turn-around traveling, as illustrated in FIG. 6, a large gap W is formed between the forward route and the return route. When the ball collecting and discharging portion 23 has a horizontal width of about 1.4 m and a minimum turning radius of about 2.4 m, for example, the gap W, which is a remnant width, is about 3.4 m, for example.

One solution for the above problem is to create a traveling route connecting a plurality of lap routes to each other by shifting the lap routes laterally.

Figure 7:
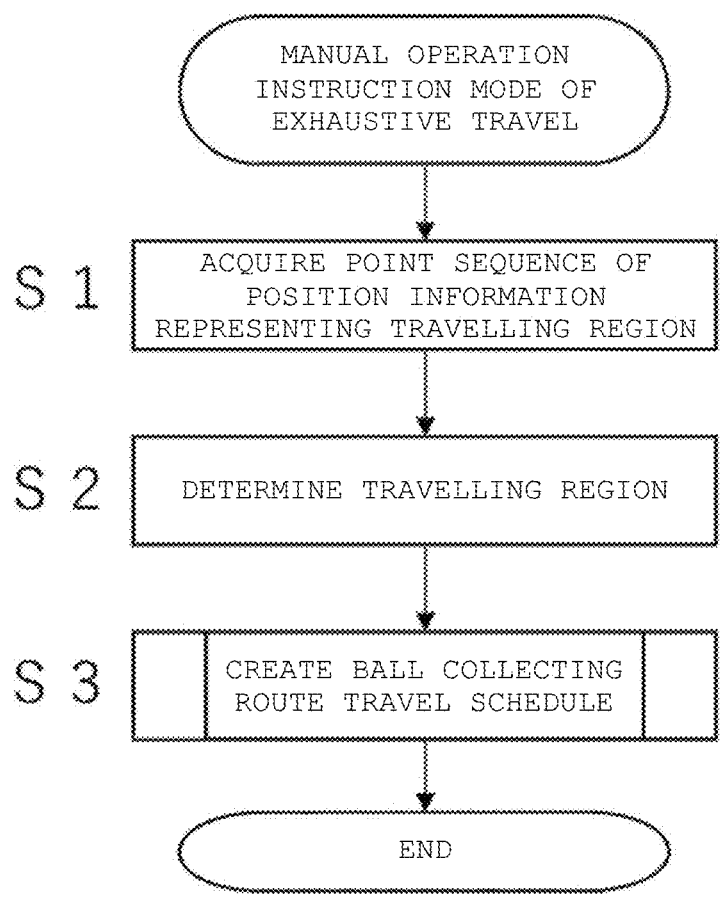
FIG. 7 is a flowchart illustrating a control operation of a manual operation instruction mode of exhaustive travel.

With reference to FIG. 7, the manual operation instruction mode of exhaustive travel will be described. FIG. 7 is a flowchart illustrating a control operation of the manual operation instruction mode of exhaustive travel.

The control flowchart described below is an example, and each step can be omitted or replaced as necessary. A plurality of steps may be executed simultaneously, or some or all of the steps may be executed in an overlapping manner. Furthermore, each block of the control flowchart is not limited to a single control operation, but can be replaced by a plurality of control operations represented by a plurality of blocks. The operation of each device is a result of a command from the controller to each device, which is represented by each step of a software application.

In step S1, the ball collecting route travel schedule creator 57 acquires a point sequence (coordinate value) of position information representing the traveling region TA at the time of execution of the manual operation instruction mode.

In step S2, the ball collecting route travel schedule creator 57 determines the traveling region TA.

In step S3, the ball collecting route travel schedule creator 57 creates the ball collecting route travel schedule 101 including an exhaustive route in the traveling region TA, and stores the same in the storage 13.

Figure 8:
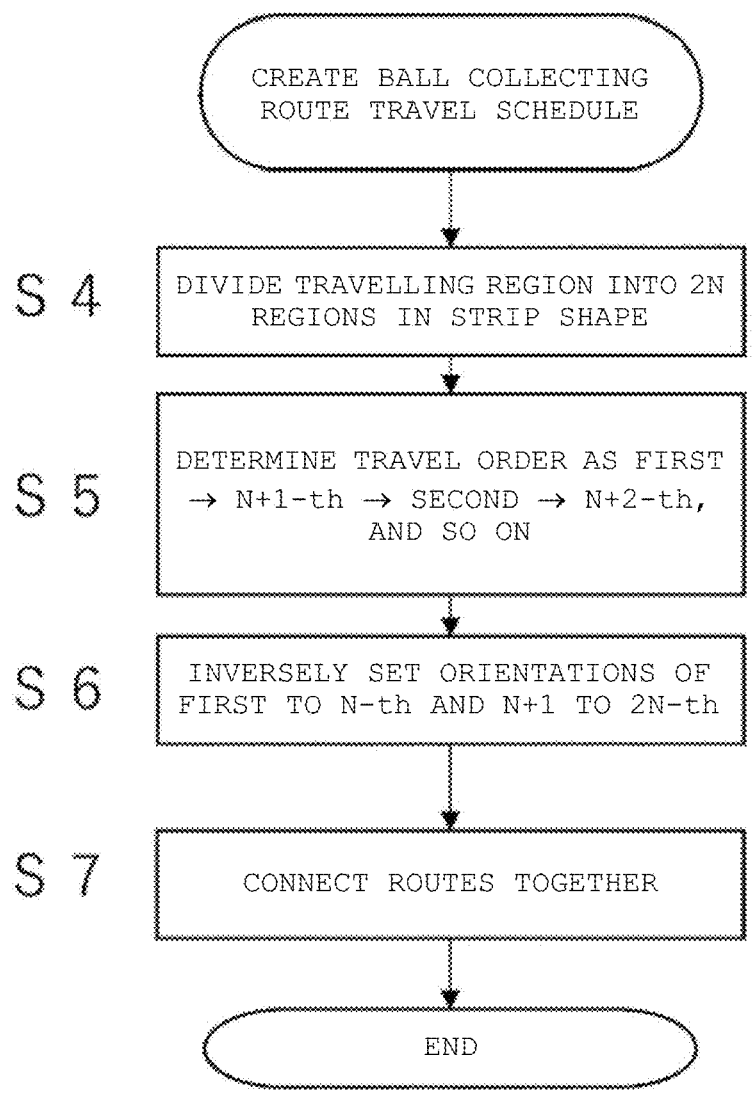
FIG. 8 is a flowchart illustrating details of steps of creating a ball collecting route travel schedule.

Step S3 of FIG. 4 will be described in detail with reference to FIGS. 8 to 12. FIG. 8 is a flowchart illustrating details of steps of creating the ball collecting route travel schedule. FIGS. 9 to 12 are schematic views illustrating in a stepwise manner a state in which the ball collecting route is created in the traveling region.

Figure 9:
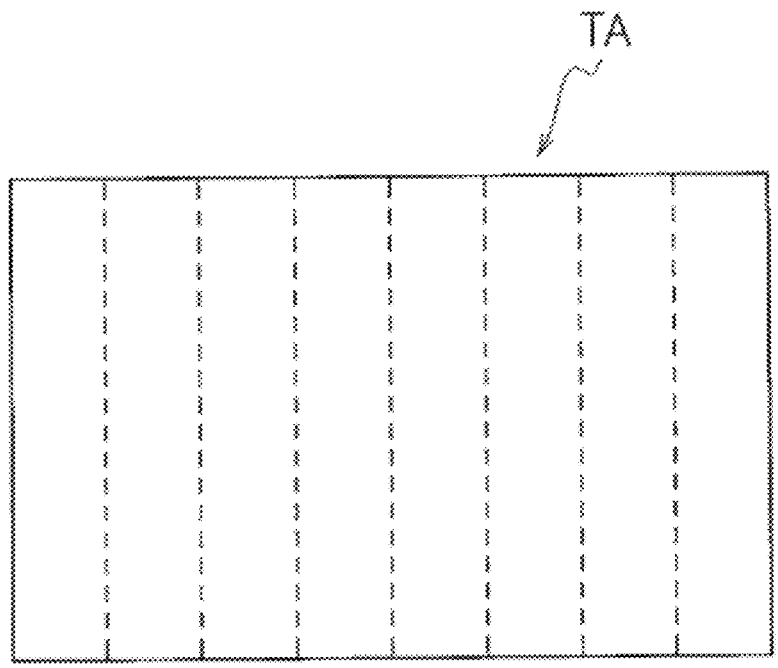
FIG. 9 is a schematic view illustrating in a stepwise manner a state in which a ball collecting route is created in a traveling region.

In step S4, as illustrated in FIG. 9, the ball collecting route travel schedule creator 57 divides the region into 2N regions in a strip shape. At this time, the longitudinal direction of each region is the main direction, and a direction orthogonal thereto is the sub direction. At this time, the width of the divided region is set to be equal to or less than the width of the ball collecting and discharging portion 23.

Figure 10:
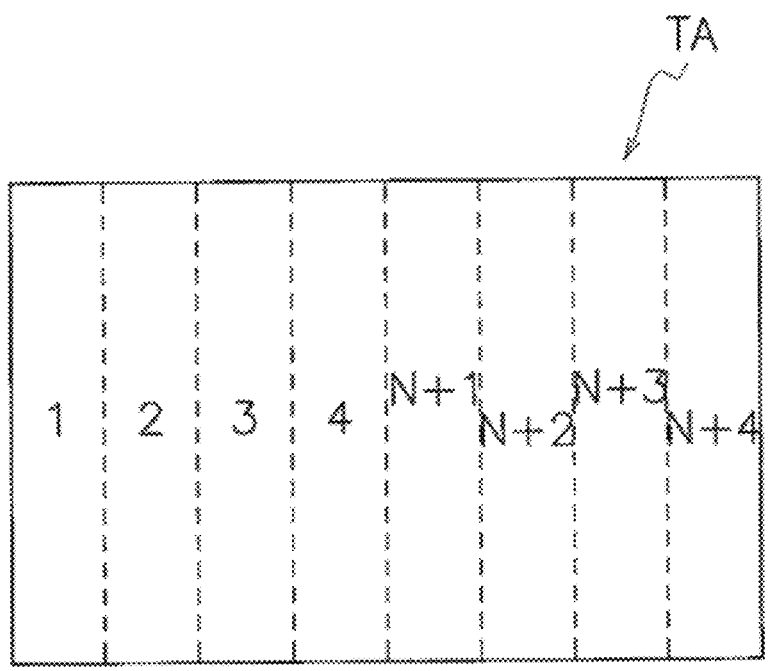
FIG. 10 is a schematic view illustrating in a stepwise manner a state in which the ball collecting route is created in the traveling region.

In step S5, as illustrated in FIG. 10, the ball collecting route travel schedule creator 57 determines a travel order of the divided regions such as the first region, the N+1-th region, the second region, the N+2-th region, and so on.

Figure 11:
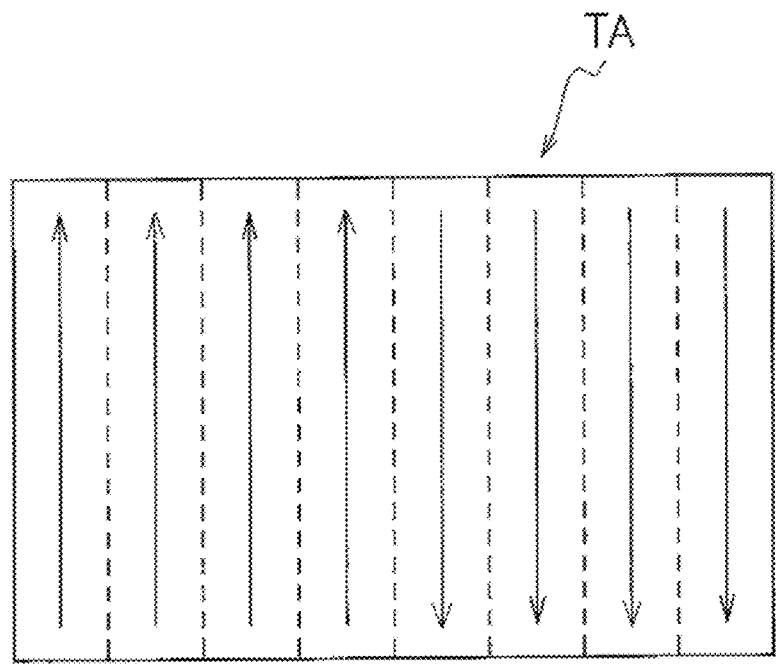
FIG. 11 is a schematic view illustrating in a stepwise manner a state in which the ball collecting route is created in the traveling region.

In step S6, as illustrated in FIG. 11, the ball collecting route travel schedule creator 57 sets a traveling route in each of the 2N regions. In this case, the travel direction of the first to N-th regions and the travel direction of the N+1 to 2N-th regions are set inversely.

Figure 12:
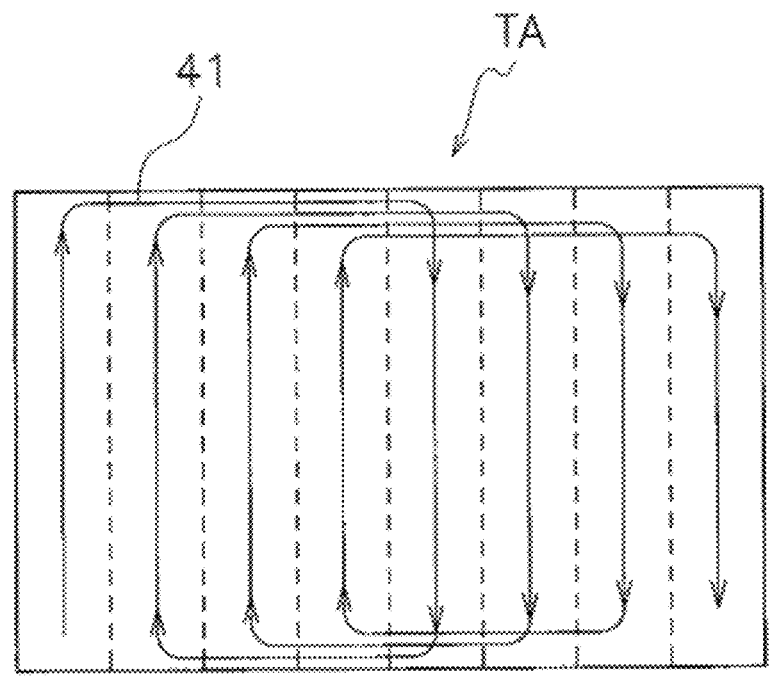
FIG. 12 is a schematic view illustrating in a stepwise manner a state in which the ball collecting route is created in the traveling region.

In step S7, as illustrated in FIG. 12, the routes are connected together. Specifically, the end point of the m (1, 2, ... N−1)-th traveling route and the start point of the m+N-th traveling route are connected together, and the end point of the m+N-th traveling route and the start point of the m+1 traveling route are connected together. This connection operation is repeated by incrementing m by one from 1 to N−1.

Furthermore, the end point of the N-th traveling route and the start point of the 2N-th traveling route are connected together, after that the end point of the 2N-th traveling route and the start point of the first traveling route are connected together, and generation of the partial traveling route is finished.

When the two traveling routes are connected as described above, as illustrated in FIG. 12, a 90° curve is provided on a connecting line of the two traveling routes. The radius of this curve is set to be equal to or greater than the minimum radius at the time of rotation of the ball collecting and discharging machine 1.

The number of regions divided to form a ball collecting route may be 2N+1 (odd number).

In addition, in order to form the ball collecting route, one lap route may be created first and reused.

The controller 15 executes the following steps.

The controller 15 causes the ball collecting and discharging portion 23 to collect the plurality of golf balls B scattered in the ball scattered area 3 while causing the traveling portion 21 to cause the main body 11 to travel along a ball collecting route 41 in the ball scattered area 3. As an example, the ball collecting route 41 performs so-called exhaustive travel, which is to travel through the overall ball scattered area 3 evenly (with no or little space between).

When the ball collecting and discharging portion 23 reaches the state of being ready to discharge balls during or after ball collecting work, the controller 15 causes the traveling portion 21 to cause the main body 11 to travel along the ball discharging route 42 and causes the ball collecting and discharging portion 23 to discharge balls at the ball discharging site 7.

In the ball collecting and discharging machine 1, the controller 15 is capable of generating individually generated (instructed) partial traveling routes in individual regions of the driving range 2. As a result, the copy traveling route having been instructed in advance by the worker can be adopted for the ball discharging route 42, and thus the ball collecting and discharging machine 1 is capable of safely and reliably approaching the ball discharging site 7, which is a region where a skilled operation for the ball collecting and discharging machine 1 is required. On the other hand, the ball collecting and discharging machine 1 is capable of collecting balls as a whole by performing the exhaustive travel in the ball scattered area 3, which is a region where the ball collecting and discharging machine 1 needs to travel evenly in a wide region in the exhaustive travel.

In the ball collecting and discharging machine 1, the controller 15 causes the traveling portion 21 to cause the main body 11 to travel along the ball discharging route 42 and causes the ball collecting and discharging portion 23 to discharge balls at the ball discharging site 7.

Figure 13:
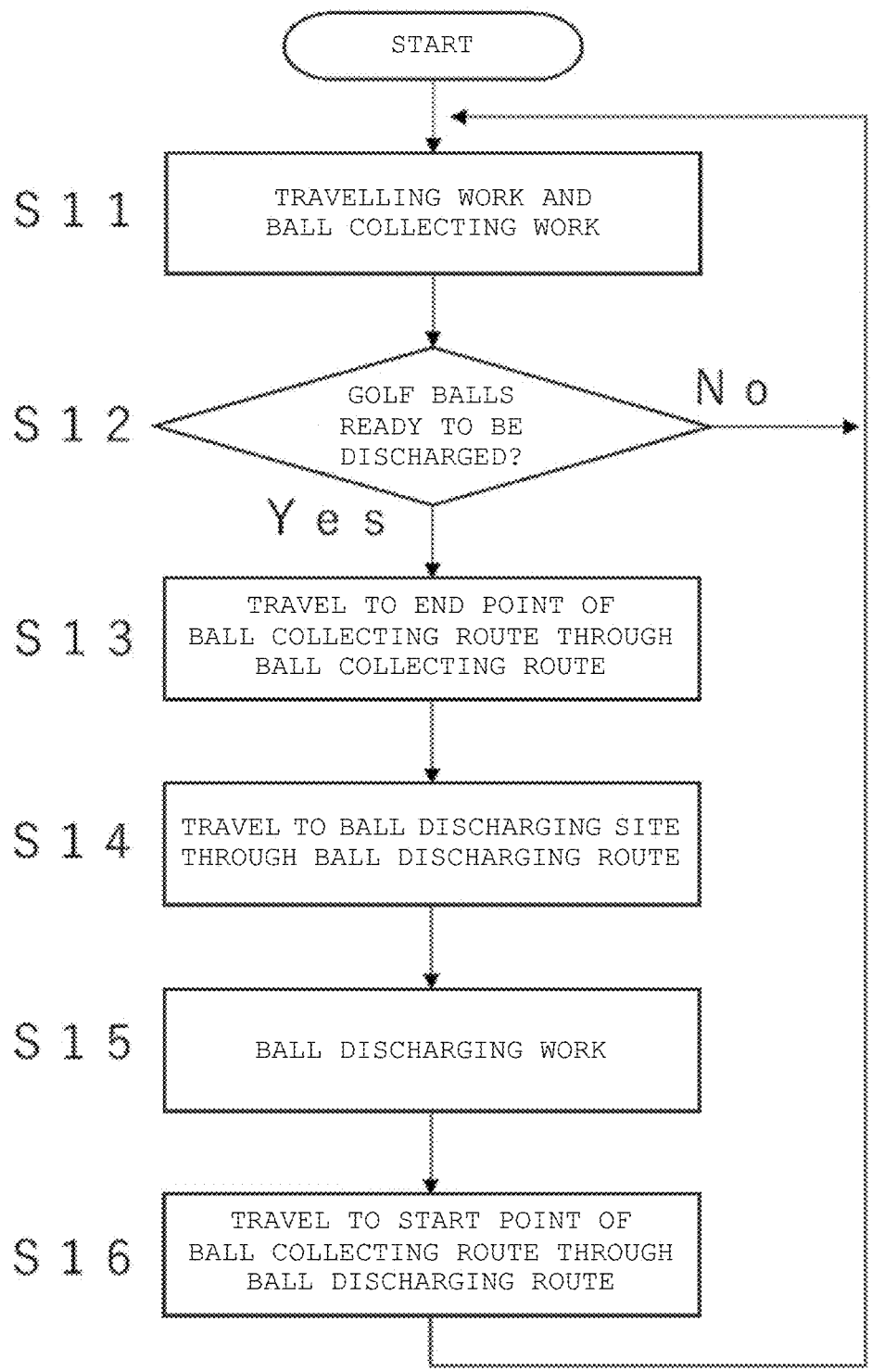
FIG. 13 is a flowchart of the control operation.
Figure 14:
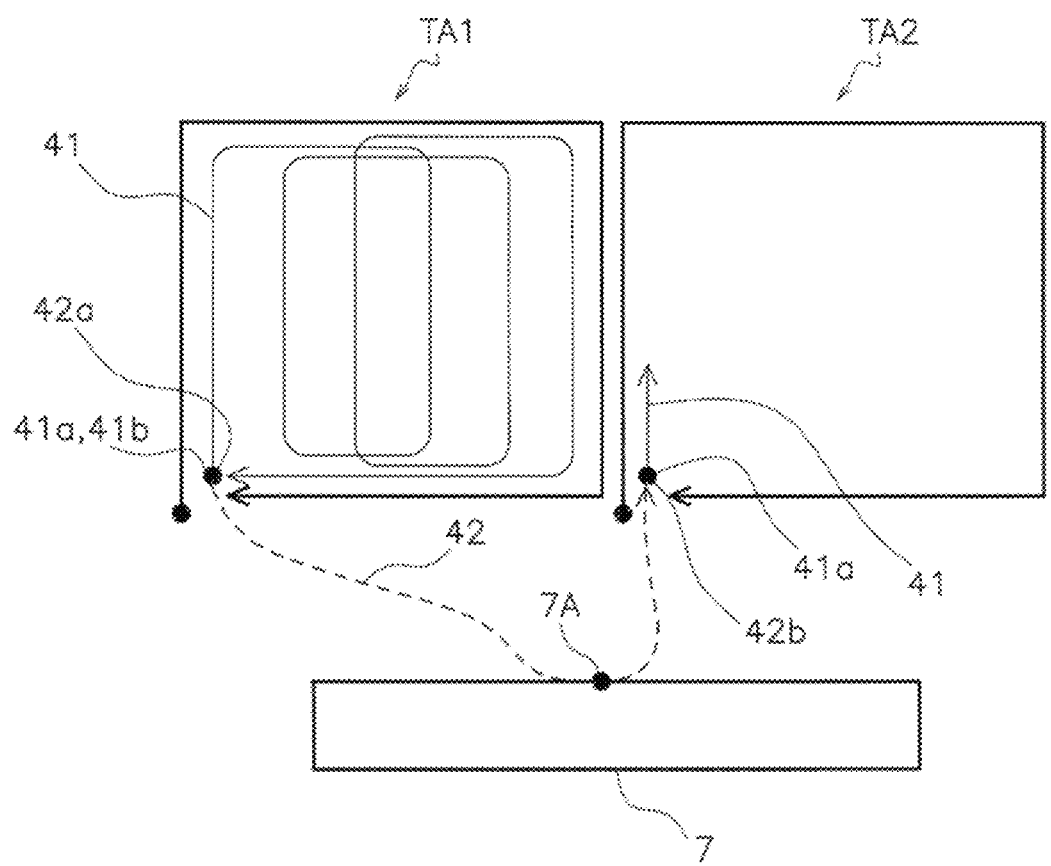
FIG. 14 is a schematic view illustrating a traveling state of the ball collecting and discharging machine.

The control operation will be described in detail with reference to FIGS. 13 and 14. FIG. 13 is a flowchart of the control operation. FIG. 14 is a schematic view illustrating the traveling state of the ball collecting and discharging machine. FIG. 14 illustrates a first traveling region TA1, a second traveling region TA2, and the ball discharging site 7. The ball discharging route 42 has a start point 42a as an end point 41b of the ball collecting route 41 of the first traveling region TA1, and an end point 42b as a start point 41a of the ball collecting route 41 of the second traveling region TA2.

In step S11, the ball collecting and discharging machine 1 executes traveling work and the ball collecting work in the first traveling region TA1. Specifically, the travel command calculator 53 transmits a travel command to the travel controller 51 based on the ball collecting route travel schedule 101, and thus the travel controller 51 drives the travel motor 31. As a result, the pickup rotor 24a picks up the golf balls B.

In step S12, it is determined whether the golf balls B have been ready to be discharged. If ready to be discharged, the process proceeds to step S13. If not, the process returns to step S11.

In step S13, the ball collecting and discharging machine 1 travels to the end point 41b of the ball collecting route 41. The ball collecting work may be either executed or stopped during the traveling in step S13.

In step S14, the ball collecting and discharging machine travels through the ball discharging route 42 to a ball discharging point 7A of the ball discharging site 7. Specifically, the travel command calculator 53 transmits a travel command to the travel controller 51 in accordance with the ball discharging route travel schedule 103 to drive the travel motor 31.

In step S15, the ball collecting and discharging machine 1 performs the ball discharging work. Specifically, the travel command calculator 53 transmits a drive command to the ball discharging controller 58 based on the ball discharging route travel schedule 103, and thus the ball discharging controller 58 drives the ball discharging portion motor 25a to open the ball discharging gate 25b. As a result, the golf balls B are discharged from the ball collecting and discharging machine 1 to the ball discharging site 7.

In step S16, the ball collecting and discharging machine 1 travels to the end point 42b (the start point 41a of the ball collecting route 41 of the second traveling region TA2) of the ball discharging route 42. Specifically, the travel command calculator 53 transmits a travel command to the travel controller 51 in accordance with the ball discharging route travel schedule 103 to drive the travel motor 31.

In this preferred embodiment, the end point 41b of the ball collecting route 41 and the start point 42a of the ball discharging route 42 match in the first traveling region TA1. Accordingly, regardless of whether the ball collecting and discharging portion 23 is ready to discharge balls, the controller 15 causes the traveling portion 21 to cause the main body 11 to travel along the ball collecting route 41 to the end, and then causes the traveling portion 21 to cause the main body 11 to travel along the ball discharging route 42.

In the ball collecting and discharging machine 1, since the end point 41b of the ball collecting route 41 and the start point 42a of the ball discharging route 42 match, the ball collecting and discharging machine 1 always travels to the end point 41b of the ball collecting route 41 and moves to the ball discharging route 42 even if the ball collecting and discharging machine 1 reaches the state of being ready to discharge balls in the middle of the ball collecting route 41. Accordingly, it is not necessary for the ball collecting and discharging machine 1 to create an autonomous route plan to discharge balls, thus simplifying the travel control to discharge balls.

Since the ball collecting and discharging machine 1 does not use a storage amount detector, it always travels on the routes of the ball collecting route 41 of the first traveling region TA1, the ball discharging route 42, and the ball collecting route 41 of the second traveling region TA2.

In the above description, at the time of completing the travel on the ball collecting route 41 of the first traveling region TA1, the ball discharging operation is performed in either of a state where the golf balls B have been sufficiently collected and a state where the golf balls B have not been collected so much. Such control has a disadvantage that the golf balls B are so small in amount that they are difficult to discharge in the state where the golf balls B have not been collected so much, but it has an advantage that no special control and no storage detector are required. However, as an alternative preferred embodiment, if not ready to discharge balls at the time of completing the travel on the ball collecting route 41 of the first traveling region TA1, the ball collecting and discharging machine 1 may travel to the ball collecting route 41 of the second traveling region TA2, which is the next region, via a predetermined route (not illustrated) without performing the ball discharging operation.

The end point 42b of the ball discharging route 42 matches the start point 41a of the ball collecting route 41 in the second traveling region TA2. Accordingly, the travel control after completing discharging balls is simplified.

2. Second Preferred Embodiment

In the first preferred embodiment, the end point 41b of the ball collecting route 41 of the first traveling region TA1 and the start point 42a of the ball discharging route 42 match, but they may be different. In the first preferred embodiment, the end point 42b of the ball discharging route 42 and the start point 41a of the ball collecting route 41 of the first traveling region TA1 match, but they may be different.

Figure 15:
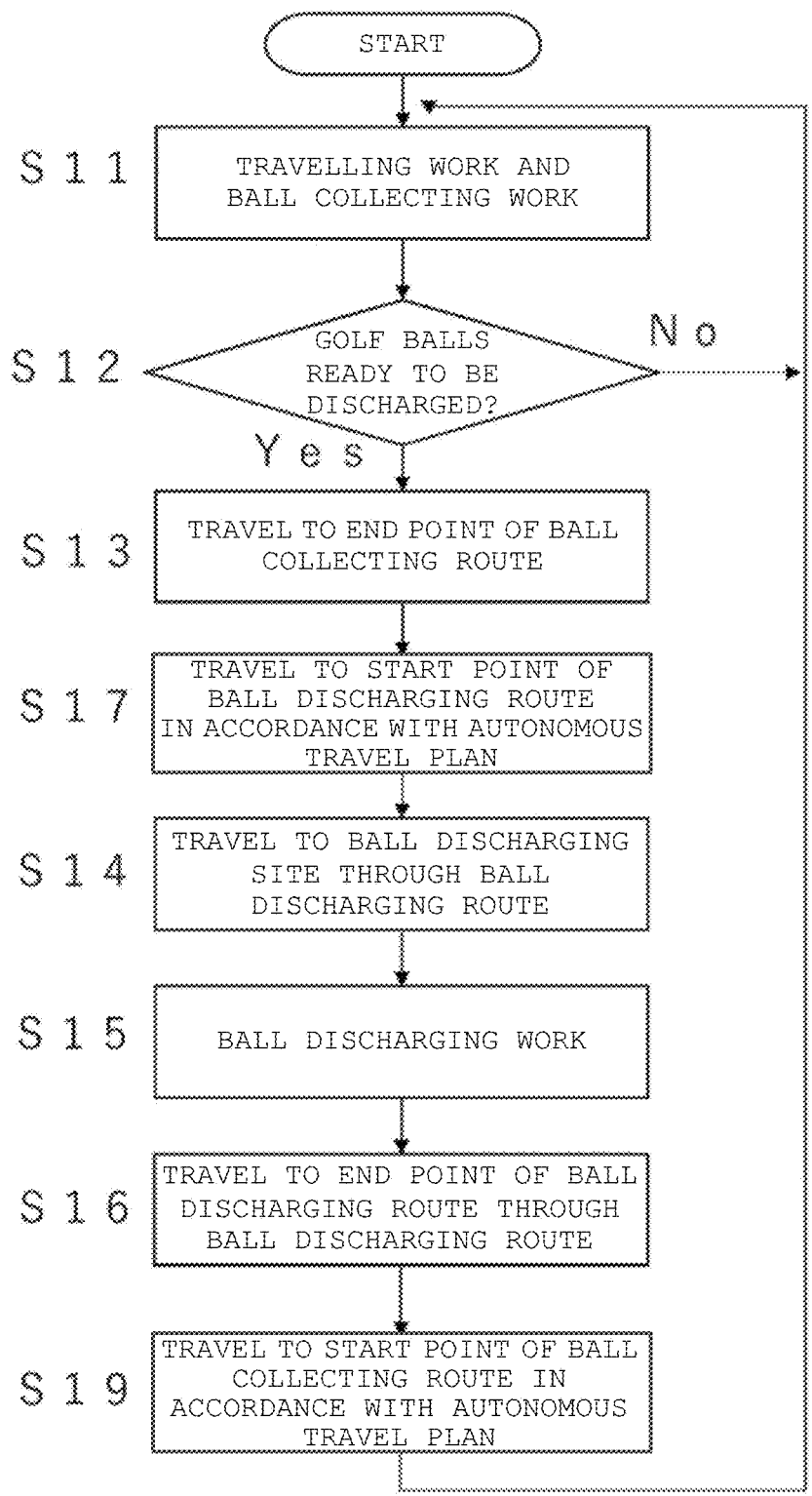
FIG. 15 is a flowchart illustrating a control operation according to a second preferred embodiment of the present invention.
Figure 16:
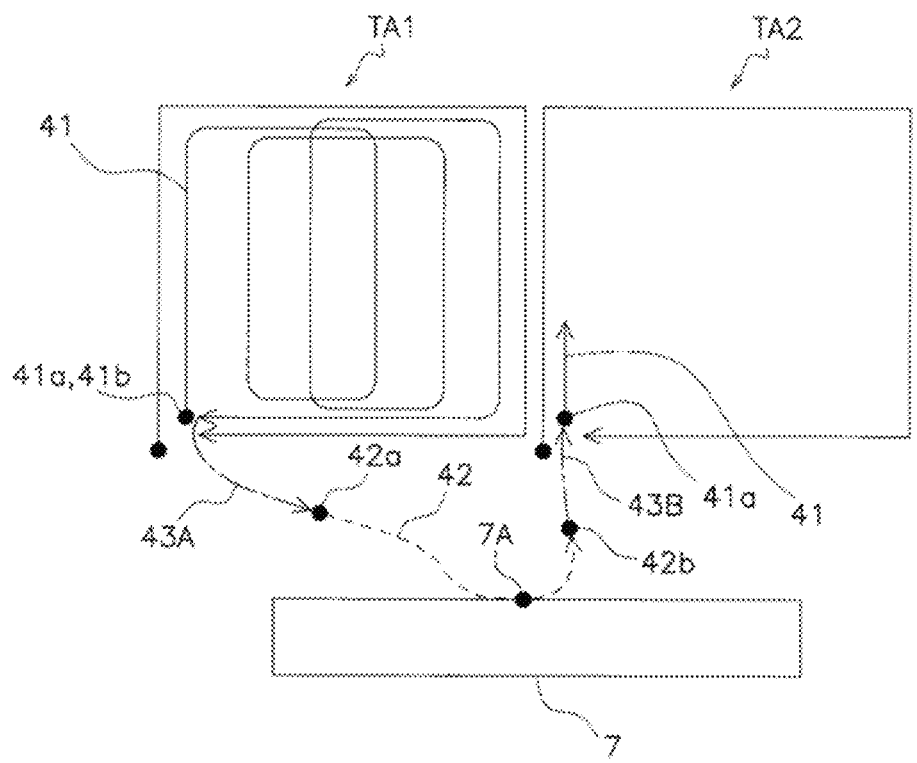
FIG. 16 is a schematic view illustrating a traveling state of a ball collecting and discharging machine.

As such a preferred embodiment, the second preferred embodiment will be described with reference to FIGS. 15 and 16. FIG. 15 is a flowchart illustrating the control operation according to the second preferred embodiment. FIG. 16 is a schematic view illustrating the traveling state of the ball collecting and discharging machine. Since the basic configuration and operation are the same as those of the first preferred embodiment, the following description will focus on differences.

In this preferred embodiment, the start point 42a of the ball discharging route 42 is at a position different from the end point 41b of the ball collecting route 41, and is located outside the first traveling region TA1. The end point 42b of the ball discharging route 42 does not match the start point 41a of the ball collecting route 41 of the second traveling region TA2, and is located outside the first traveling region TA1.

The flowchart of FIG. 15 further includes step S17 in addition to the configuration of the flowchart of FIG. 13. Step S17 is present between step S13 and step S14. In step S17, the ball collecting and discharging machine 1 travels to the start point 42a of the ball discharging route 42 through a first autonomous traveling route 43A in accordance with an autonomous travel plan. Specifically, when the ball collecting and discharging portion 23 reaches the state of being ready to discharge balls (Yes in step S12), the controller 15 plans the first autonomous traveling route 43A from the end point 41b of the ball collecting route 41 to the start point 42a of the ball discharging route 42, and causes the traveling portion 21 to cause the main body 11 to travel along the first autonomous traveling route 43A.

The flowchart of FIG. 15 further includes step S19 in addition to the configuration of the flowchart of FIG. 13. Step S19 is present after step S16. In step S19, the ball collecting and discharging machine 1 travels to the start point 41a of the ball collecting route 41 of the second traveling region TA2 through a second autonomous traveling route 43B in accordance with the autonomous travel plan. Specifically, the controller 15 plans the second autonomous traveling route 43B from the end point 42b of the ball discharging route 42 to the start point 41a of the ball collecting route 41 of the second traveling region TA2, and causes the traveling portion 21 to cause the main body 11 to travel along the second autonomous traveling route 43B.

In this preferred embodiment, the positions of the start point 42a and the end point 42b of the ball discharging route 42 can be set in any manner, thus increasing the degree of freedom in setting the ball discharging route 42.

In this preferred embodiment, since the start point 42a and the end point 42b of the ball discharging route 42 are located outside the traveling region, the ball collecting and discharging machine 1 having collected balls in, for example, the first traveling region TA1, the second traveling region TA2, or another traveling region is capable of performing the ball discharging operation by using the ball discharging route 42. Accordingly, even if there are two or more traveling regions, it is not necessary to increase the number of ball discharging routes.

3. Third Preferred Embodiment

Figure 17:
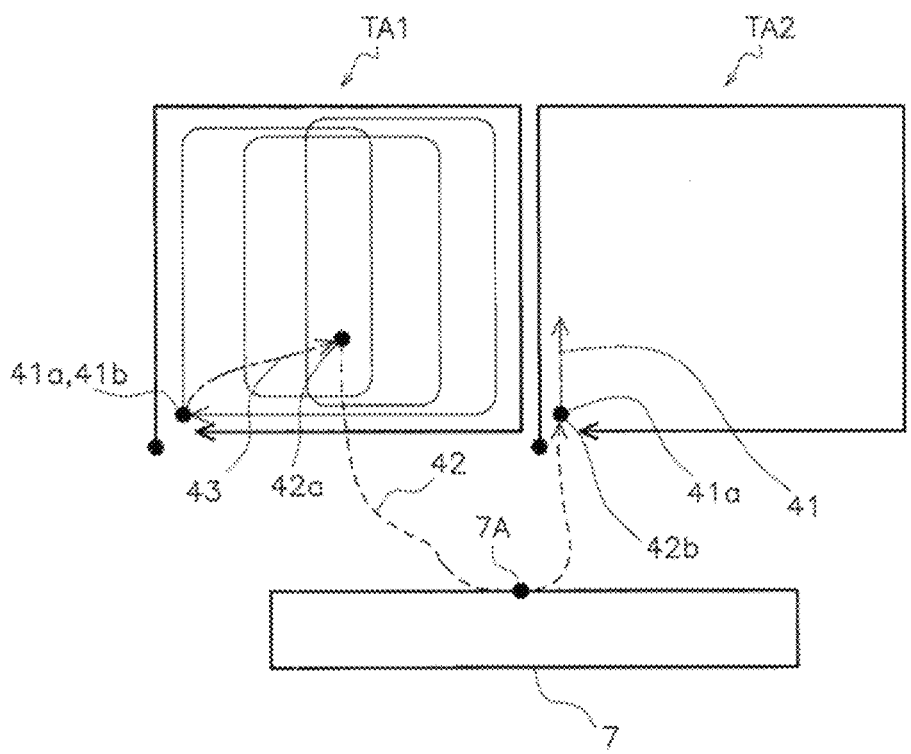
FIG. 17 is a schematic view illustrating a traveling state of a ball collecting and discharging machine of a third preferred embodiment of the present invention.

An alternative preferred embodiment of the second preferred embodiment will be described with reference to FIG. 17. FIG. 17 is a schematic view illustrating the traveling state of the ball collecting and discharging machine of the third preferred embodiment. Since the basic configuration and operation are the same as those of the second preferred embodiment, the following description will focus on differences.

In this preferred embodiment, unlike the second preferred embodiment, the start point 42a of the ball discharging route 42 is located inside the first traveling region TA1.

When the ball collecting and discharging portion 23 reaches the state of being ready to discharge balls, the controller 15 causes the traveling portion 21 to cause the main body 11 to travel to the end point 41b of the ball collecting route 41. Next, the controller 15 plans an autonomous traveling route 43 from the end point 41b of the ball collecting route 41 to the start point 42a of the ball discharging route 42, and causes the traveling portion 21 to cause the main body 11 to travel along the autonomous traveling route 43.

In this preferred embodiment, the positions of the start point 42a of the ball discharging route 42 can be set in any manner, thus increasing the degree of freedom in setting the ball discharging route 42.

4. Fourth Preferred Embodiment

In the first to third preferred embodiments, when becoming ready to discharge balls, the ball collecting and discharging machine 1 moves to the end point 41b of the ball collecting route 41 of the first traveling region TA1, and then moves to the ball discharging route 42. However, when becoming ready to discharge balls, the ball collecting and discharging machine 1 may start moving to the ball discharging route 42 from that point or its vicinity.

Figure 18:
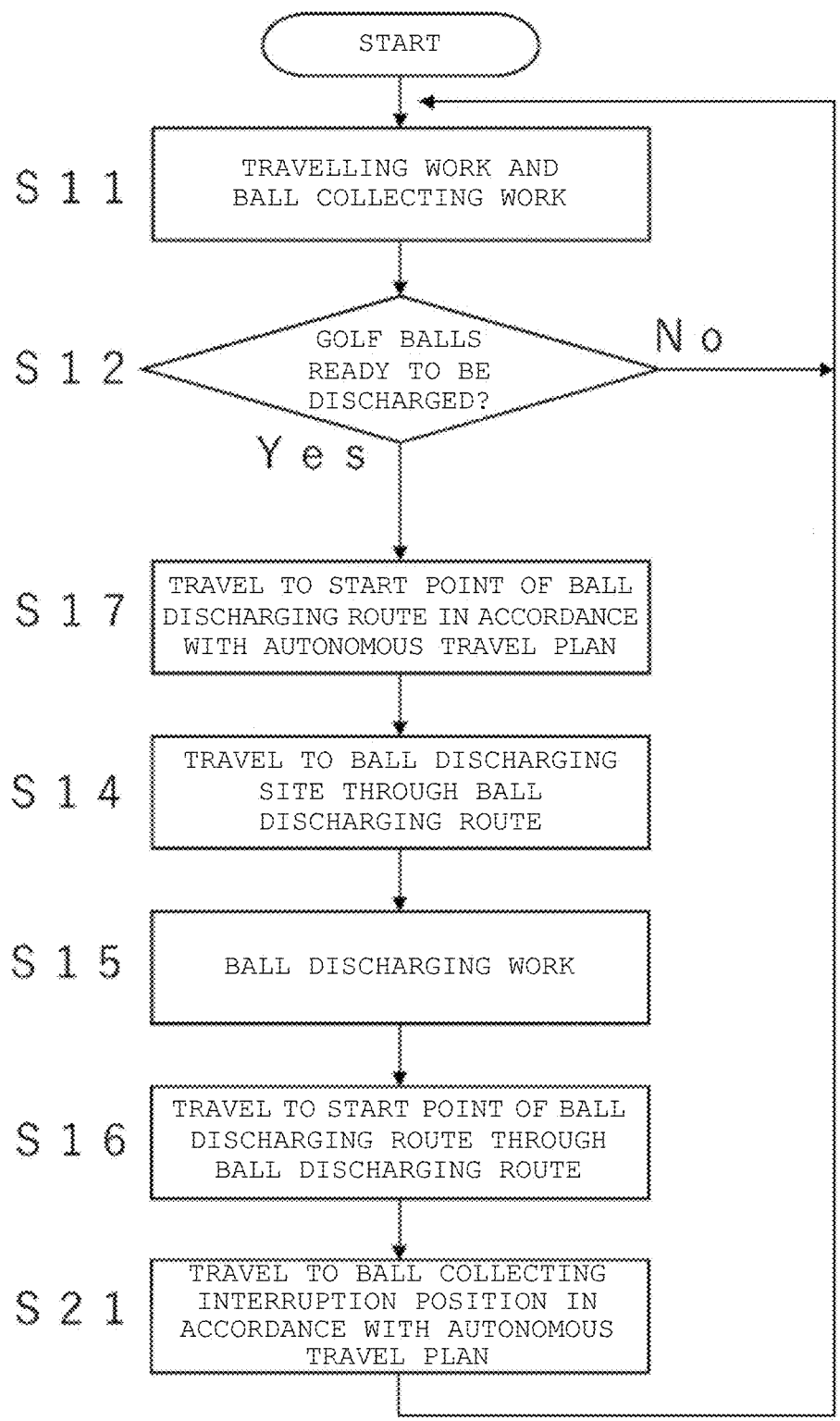
FIG. 18 is a flowchart illustrating a control operation according to a fourth preferred embodiment of the present invention.
Figure 19:
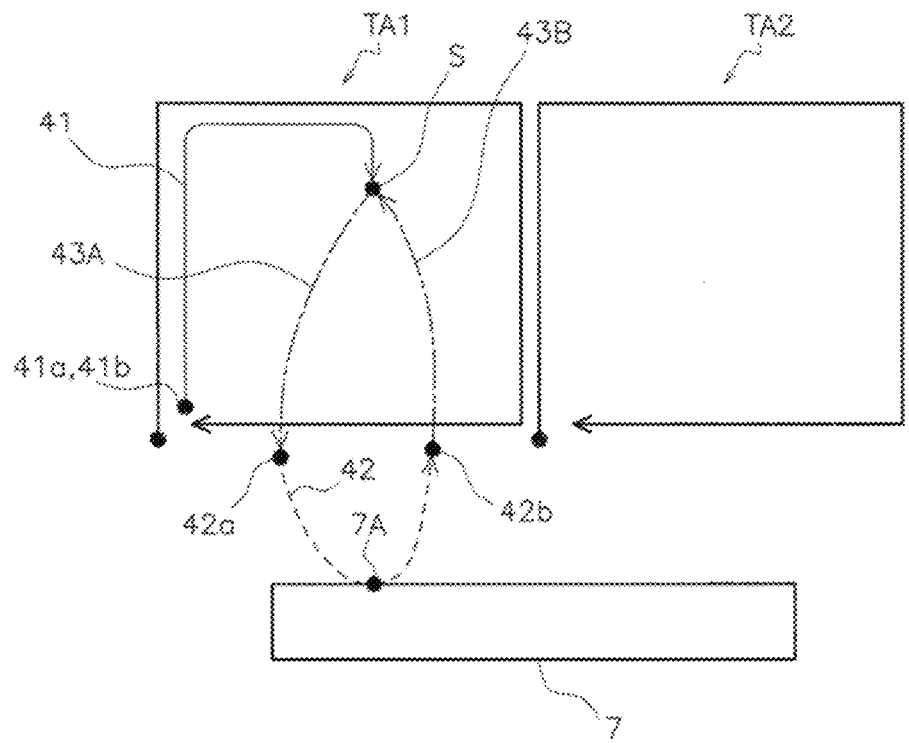
FIG. 19 is a schematic view illustrating a traveling state of a ball collecting and discharging machine.

Such a preferred embodiment will be described as the fourth preferred embodiment with reference to FIGS. 18 and 19. FIG. 18 is a flowchart illustrating the control operation according to the fourth preferred embodiment. FIG. 19 is a schematic view illustrating the traveling state of the ball collecting and discharging machine. Since the basic configuration and operation are the same as those of the second preferred embodiment, the following description will focus on differences.

In this preferred embodiment, the start point 42a of the ball discharging route 42 is set outside the first traveling region TA1. Furthermore, unlike in the first to third preferred embodiments, the end point 42b of the ball discharging route 42 is set outside the first traveling region TA1.

In comparison with the flowchart of FIG. 15 (the second preferred embodiment), the flowchart of FIG. 18 lacks step S13 and includes step S21 in place of step S19.

In step S17, when becoming ready to discharge balls, the controller 15 plans the first autonomous traveling route 43A from that position (a ball collecting work interruption position S) to the start point 42a of the ball discharging route 42, and causes the traveling portion 21 to cause the main body 11 to travel along the first autonomous traveling route 43A. That is, the ball collecting work having been performed until then is interrupted.

In this preferred embodiment, upon grasping that the ball collecting and discharging machine 1 has become ready to discharge balls by using a storage amount detector (not illustrated) or another method or device, the ball collecting and discharging machine 1 interrupts the ball collecting work and immediately plans and executes the first autonomous traveling route 43A to the start point 42a of the ball discharging route 42. Accordingly, the ball collecting and discharging machine 1 is capable of performing the ball discharging work within a short period of time after becoming ready to discharge balls.

In step S15, the ball collecting and discharging machine 1 performs the ball discharging work.

In step S16, the ball collecting and discharging machine 1 travels to the end point 42b of the ball discharging route 42. Specifically, the travel command calculator 53 transmits a travel command to the travel controller 51 in accordance with the ball discharging route travel schedule 103 to drive the travel motor 31.

In step S21, the controller 15 plans the second autonomous traveling route 43B from the end point 42b of the ball discharging route 42 to the position S where the ball collecting and discharging portion 23 having interrupted the ball collecting work, and causes the traveling portion 21 to cause the main body 11 to travel along the second autonomous traveling route 43B.

In this preferred embodiment, upon completing the ball discharging work, the ball collecting and discharging machine 1 plans and travels on the second autonomous traveling route 43B from the end point 42b of the ball discharging route 42 to the ball collecting work interruption position S. That shortens the length of time from finishing the ball discharging work to resuming the ball collecting work.

In this preferred embodiment, the ball collecting and discharging machine 1 has an advantage of being capable of interrupting and resuming the ball collecting operation. Furthermore, similarly to the second preferred embodiment, there is an advantage that only one ball discharging route is required.

5. Fifth Preferred Embodiment

Figure 20:
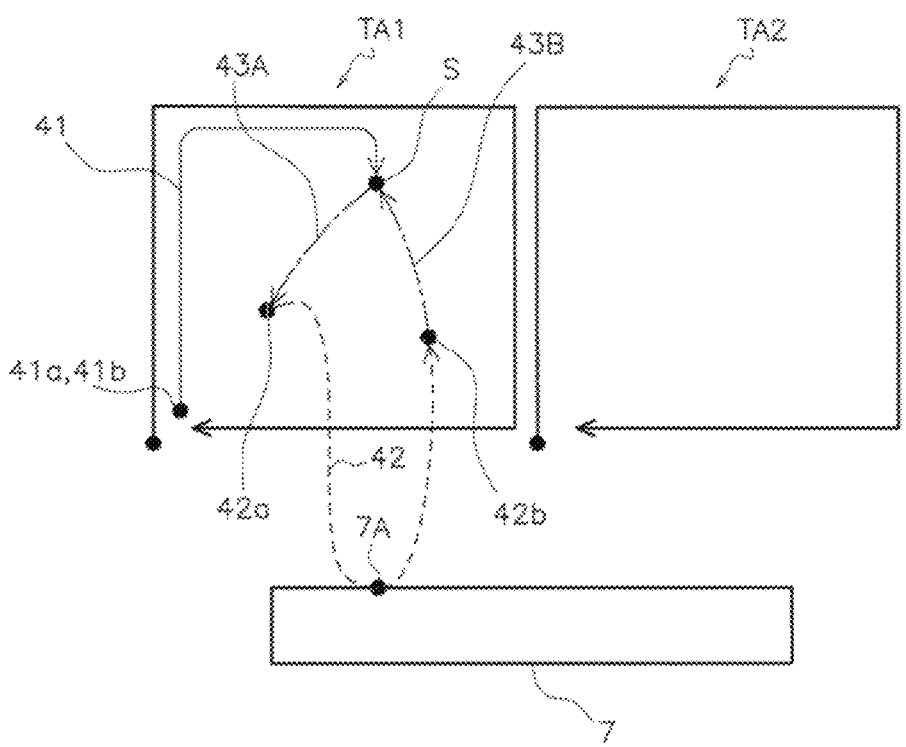
FIG. 20 is a schematic view illustrating a traveling state of a ball collecting and discharging machine of a fifth preferred embodiment of the present invention.

An alternative preferred embodiment of the fourth preferred embodiment will be described with reference to FIG. 20. FIG. 20 is a schematic view illustrating the traveling state of the ball collecting and discharging machine of the fifth preferred embodiment.

In this preferred embodiment, unlike the fourth preferred embodiment, the start point 42a and the end point 42b of the ball discharging route 42 are located inside the first traveling region TA1.

In this preferred embodiment, when becoming ready to discharge balls, the ball collecting and discharging machine 1 interrupts the ball collecting work and immediately plans and executes the first autonomous traveling route 43A to the start point 42*a* of the ball discharging route 42, and therefore the ball collecting and discharging machine 1 is capable of performing the ball discharging work within a short period of time after becoming ready to discharge balls.

In this preferred embodiment, upon completing the ball discharging work, the ball collecting and discharging machine 1 plans and executes the second autonomous traveling route 43B from the end point 42*b* of the ball discharging route 42 to the ball collecting work interruption position S, and therefore the length of time from finishing the ball discharging work to resuming the ball collecting work is shortened.

Common matters of the first to fifth preferred embodiments are as follows.

The ball collecting and discharging machine (e.g., the ball collecting and discharging machine 1) is a device that collects and discharges balls by performing an instruction reproduction travel in a ball collecting and discharging portion (e.g., the driving range 2) having a ball scattered area (e.g., the ball scattered area 3) where a plurality of balls (e.g., the golf balls B) are scattered and a ball discharging site (e.g., the ball discharging site 7) where the collected balls are discharged. The ball collecting and discharging machine includes a main body, a storage, and a controller.

The main body (e.g., the main body 11) includes a traveling portion (e.g., the traveling portion 21) and a ball collecting and discharging portion (e.g., the ball collecting and discharging portion 23) that is capable of performing operations of collecting balls and discharging balls.

The storage (e.g., the storage 13) stores, as a copy traveling route having been instructed in advance by a worker, information (e.g., the ball discharging route travel schedule 103) on a ball discharging route (e.g., the ball discharging route 42) in which at least a portion thereof is in a vicinity of the ball discharging site.

The controller causes the ball collecting and discharging portion to collect the plurality of balls scattered in the ball scattered area while causing the traveling portion to cause the main body to travel along a ball collecting route (e.g., the ball collecting route 41) in the ball scattered area. Furthermore, when the ball collecting and discharging portion reaches the state of being ready to discharge balls during or after ball collecting work, the controller causes the traveling portion to cause the main body to travel along the ball discharging route and causes the ball collecting and discharging portion to discharge balls at the ball discharging site.

Since the ball discharging route is a copy traveling route having been instructed in advance by the worker, the ball collecting and discharging machine is capable of safely and reliably approaching the ball discharging site. At the time of ball collecting work, on the other hand, the ball collecting and discharging machine is capable of traveling in the ball scattered area by an efficient method other than the copy traveling route.

7. Other Preferred Embodiments

The present invention has been described above in regard to the plurality of preferred embodiments, but the present invention is not limited to the above-described preferred embodiments, and various modifications can be made without departing from the scope of the present invention. In particular, the plurality of preferred embodiments and alternative preferred embodiments described in the present description can be combined in any manner as necessary or desirable.

The absolute position of an autonomously traveling carriage on the ground is acquired by the GNSS method in the above preferred embodiments, but the absolute position of the autonomously traveling carriage may be acquired by another method.

As the positioning method by GNSS, the RTK-GPS (Real Time Kinematics Global Positioning System) is used in the above preferred embodiments, but the GPS (Global Positioning System) or the QZSS (Quasi-Zenith Satellite System) may be used.

The target of the ball collecting and discharging is golf balls in the above preferred embodiments, but other balls or scattered objects may be the target.

Only one ball discharging route is provided in the first traveling region TA1 in the above preferred embodiments, but a plurality of ball discharging routes may be provided. In that case, the ball collecting and discharging machine selects any one of the ball discharging routes. The criterion for selection is, for example, the short distance from the point where the balls are ready to be discharged to the start point of each ball discharging route. In addition, for the purpose of preventing damage to the lawn, the routes for autonomous traveling may be appropriately dispersed.

The controller determines whether to be able to discharge the balls using the sensor in the above preferred embodiments, but the controller may determine whether to be able to discharge the balls based on the distance in which the ball collecting and discharging machine has travelled.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ball collecting and discharging machine that collects and discharges balls by performing an instruction reproduction travel in a ball collecting and discharging portion including a ball scattered area where a plurality of balls are scattered and a ball discharging site where collected balls are discharged, the ball collecting and discharging machine comprising:

a main body including a traveling portion and a ball collecting and discharging portion and that is capable of performing operations of collecting balls and discharging balls;

a storage to store, as a copy traveling route having at least a portion thereof in a vicinity of the ball discharging site and having been instructed in advance by a worker using a traveling route instructor to control the traveling portion to cause the main body to travel along the copy traveling route, information on a ball discharging route in which at least a portion of the ball discharging route is in the vicinity of the ball discharging site; and a controller; wherein the controller is configured or programmed to:

cause the ball collecting and discharging portion to collect the plurality of balls scattered in the ball scattered area while causing the traveling portion to cause the main body to travel along a filling route in a traveling region; and cause the traveling portion to cause the main body to travel along the ball discharging route and cause the ball collecting and discharging portion to discharge balls at the ball discharging site when the ball collecting and discharging portion reaches a state of being ready to discharge balls during or after ball collecting work.

2. The ball collecting and discharging machine according to claim 1, wherein
- the ball collecting and discharging portion includes a storage amount detector for the balls; and
- the state of being ready to discharge balls is a state in which a storage amount of the balls exceeds a threshold value.

3. The ball collecting and discharging machine according to claim 1, wherein the controller, when the ball collecting and discharging portion reaches the state of being ready to discharge balls, plans an autonomous traveling route up to a start point of the ball discharging route and causes the traveling portion to cause the main body to travel along the autonomous traveling route.

4. The ball collecting and discharging machine according to claim 3, wherein the controller, when the ball collecting and discharging portion reaches the state of being ready to discharge balls, causes the ball collecting and discharging portion to interrupt a ball collecting work, and next, plans an autonomous traveling route up to a start point of the ball discharging route and causes the traveling portion to cause the main body to travel along the autonomous traveling route.

5. The ball collecting and discharging machine according to claim 4, wherein the controller plans an autonomous traveling route from an end point of the ball discharging route to a position where the ball collecting and discharging portion interrupted a ball collecting work, and causes the traveling portion to cause the main body to travel along the autonomous traveling route.

6. The ball collecting and discharging machine according to claim 3, wherein
- an end point of the filling route and a start point of the ball discharging route match; and
- when the ball collecting and discharging portion reaches the state of being ready to discharge balls, the controller causes the traveling portion to cause the main body to travel along the filling route, and then causes the traveling portion to cause the main body to travel along the ball discharging route.

7. The ball collecting and discharging machine according to claim 1, wherein
- an end point of the filling route and a start point of the ball discharging route match; and
- when the ball collecting and discharging portion reaches the state of being ready to discharge balls, the controller causes the traveling portion to cause the main body to travel along the filling route, and then causes the traveling portion to cause the main body to travel along the ball discharging route.

* * * * *